US005301852A

United States Patent [19]

Mancini

[11] Patent Number: 5,301,852

[45] Date of Patent: Apr. 12, 1994

[54] MANUALLY OPERATED PUMP FOR DISPENSING LIQUID OR CREAMY SUBSTANCES AT A PREDETERMINED CONSTANT PRESSURE

[75] Inventor: Carlo Mancini, Francavilla al Mare, Italy

[73] Assignee: Exo S.r.l., Chieti, Italy

[21] Appl. No.: 955,051

[22] Filed: Oct. 1, 1992

[30] Foreign Application Priority Data

Oct. 11, 1991 [IT] Italy ..................... MI 91 A 002698

[51] Int. Cl.[5] ..................... G01F 11/04

[52] U.S. Cl. ..................... 222/321; 222/340; 222/385

[58] Field of Search ............... 222/321, 340, 341, 383, 222/385; 239/333

[56] References Cited

U.S. PATENT DOCUMENTS 3,187,960 6/1965 Gorman ..................... 222/321
3,779,464 12/1973 Malone ..................... 222/321 X
3,940,029 2/1976 Horvath ..................... 222/340
4,183,449 1/1980 Blake ..................... 222/340
5,183,187 2/1993 Martin ..................... 222/341 X

FOREIGN PATENT DOCUMENTS 0201701 11/1986 European Pat. Off. .
0374348 6/1990 European Pat. Off. .
0437131 7/1991 European Pat. Off. .
2097353 3/1972 France .
2177357 11/1973 France .
2380076 10/1978 France ..................... 222/341

*Primary Examiner*—Andres Kashnikow
*Assistant Examiner*—Joseph A. Kaufman
*Attorney, Agent, or Firm*—Oblon, Spivak, McClelland, Maier & Neustadt

[57] ABSTRACT

The invention relates to a manually operated pump able to dispense liquid or creamy substances at a predetermined constant pressure. The pump comprises a hollow main body carrying a dip tube and fixable to the mouth of a container containing the substance to be dispensed. The cavity of the main body houses a movable piston and a stem which are sealedly connected together. The piston is sealedly slidable along a cylindrical surface of the main body and is urged by a spring which maintains the stem thrust against a stop on the main body, with a stem appendix projecting to the outside. Between the stem and the piston a chamber is defined which houses in a sealedly mobile manner a valving member which is urged by a spring against an annular ridge projecting from the opposing surface of the piston. The two springs are isolated from the path taken by the substance to be dispensed, and the delivery pressure of the substance can be easily predetermined.

3 Claims, 2 Drawing Sheets

MANUALLY OPERATED PUMP FOR DISPENSING LIQUID OR CREAMY SUBSTANCES AT A PREDETERMINED CONSTANT PRESSURE

BACKGROUND OF THE INVENTION

1. Field of the Invention

This invention relates to a hand pump for dispensing creamy or liquid substances, including atomized dispensing, at a predetermined constant pressure, the pump having no metal parts in contact with the substance to be dispensed.

2. Discussion of the Related Art

Numerous types of manually operated pumps exist which when operated dispense creamy or liquid substances in atomized form.

These pumps generally suffer from the drawback that as the dispensed liquid or fluid passes through the pump ducts it comes into contact with metal components such as springs or balls, which limits their use to non-corrosive fluids and liquids, or to fluids and liquids which cannot be contaminated by said metal components. In addition, the more simple types of such pumps also suffer from the drawback that the quality of atomization of the dispensed liquid and the pressure with which it leaves the nozzle of the dispenser applied to the pump depend on the speed with which the pump is operated and the force applied.

Pumps of known type are constructed such that the creamy or liquid substance is dispensed only when it has reached a certain pressure within the pressure chamber. These pumps generally comprise a valving member movable against a spring, which closes the passage for the creamy or liquid substance through the duct leading to the dispensing nozzle. This passage opens only when a certain pressure has been transmitted to the creamy or liquid substance contained in the pressure chamber. Under rest conditions, the valving member seals against an abutment rigid with a movable stem forming part of the pump. When the opposing force of the spring has been overcome, the valving member opens to provide the creamy or liquid substance with only a very narrow passage for its delivery, this generating a large pressure drop which allows only a weak flow, with the result that the creamy or liquid substance leaves the nozzle dripping and poorly atomized.

A defect of these pumps is therefore the fact that as the valving member opens gradually and slowly it does not allow effective atomization during opening and closure, resulting in dripping. In addition, in said pumps of known type the creamy of liquid substance is in contact with the metal parts of the pump.

SUMMARY OF THE INVENTION

The main objects of the present invention are to provide a simple pump of simple and low-cost construction which dispenses creamy or liquid substances in finely atomized form at a predetermined constant pressure without said creamy or liquid substances making contact with metal parts.

These and further objects are attained by a pump comprising an elongate hollow body open at one end and closed at the other end by an end wall in which a hole is provided at which there projects outwardly from the body a hollow appendix into which one end of a dip tube can be inserted, a piston housed in and movable within the cavity of said body and having, at that end close to said end wall of the hollow body, a portion which slides in a sealed manner along a corresponding portion of the hollow body, there projecting from the piston in proximity to its other end an annular collar which slides along a corresponding cylindrical portion of the hollow body, the piston being traversed by a substantially axial longitudinal duct one end of which opens into a widened recess delimited by an endless annular ridge projecting from said other end of the piston, which is sealedly connected to a widened portion of a hollow stem housed in the cavity of said body and retained therein by a retention element provided on the hollow body, from said widened portion of the stem there extending, outwards from the hollow body, an elongate cylindrical appendix traversed by a fluid dispensing channel, the stem cavity at said widened portion defining with the opposing end of the piston connected to it a chamber, at the center of which said annular ridge on the piston is positioned, a valving member being housed and movable within said chamber and having a widened base with a peripheral cylindrical edge which sealedly slides along the adjacent cylindrical surface of a cavity defined by the widened stem portion, between the valving member and the stem there being provided a precompressed spring which when the pump is at rest maintains the valving member pressed against said annular piston ridge to seal against it, in the cylindrical appendix of the valving member there being provided a duct open only at the free end of the appendix, there being provided in the base of the valving member at least one substantially radial hole one end of which opens into the duct in the cylindrical appendix of the valving member and the other end of which opens into said chamber in a region between said peripheral cylindrical edge of the valving member and the annular piston ridge beyond the periphery of the ridge, the piston together with said stem being urged towards and against said retention element of the hollow body by a precompressed spring which acts between said hollow body and said piston, there being provided within the hollow body a unidirectional valve which closes the hole provided in the end wall of the hollow body and allows fluid to enter the pump.

Preferably, the pump is characterized in that an elongate appendix projects from the base of the valving member and extends into and is sealedly movable within a cylindrical seat provided in said elongate appendix of the stem, the spring which acts between the valving member and stem being positioned between the widened base of the valving member and that portion of the elongate appendix of the valving member which seals against the respective seat of the stem.

Again preferably, said unidirectional valve consists of a profiled body which can sealedly rest in a profiled seat provided in the end wall of the hollow body in correspondence with the hole provided within it, from said profiled body there projecting an elongate rod which extends into and is movable within the duct traversing said piston.

BRIEF DESCRIPTION OF THE DRAWINGS

The operation and structure of the pump according to the invention will be more apparent from the description of a preferred embodiment thereof given hereinafter by way of example with reference to the accompanying drawings, in which.

DESCRIPTION OF THE PREFERRED EMBODIMENT

Figure 1:
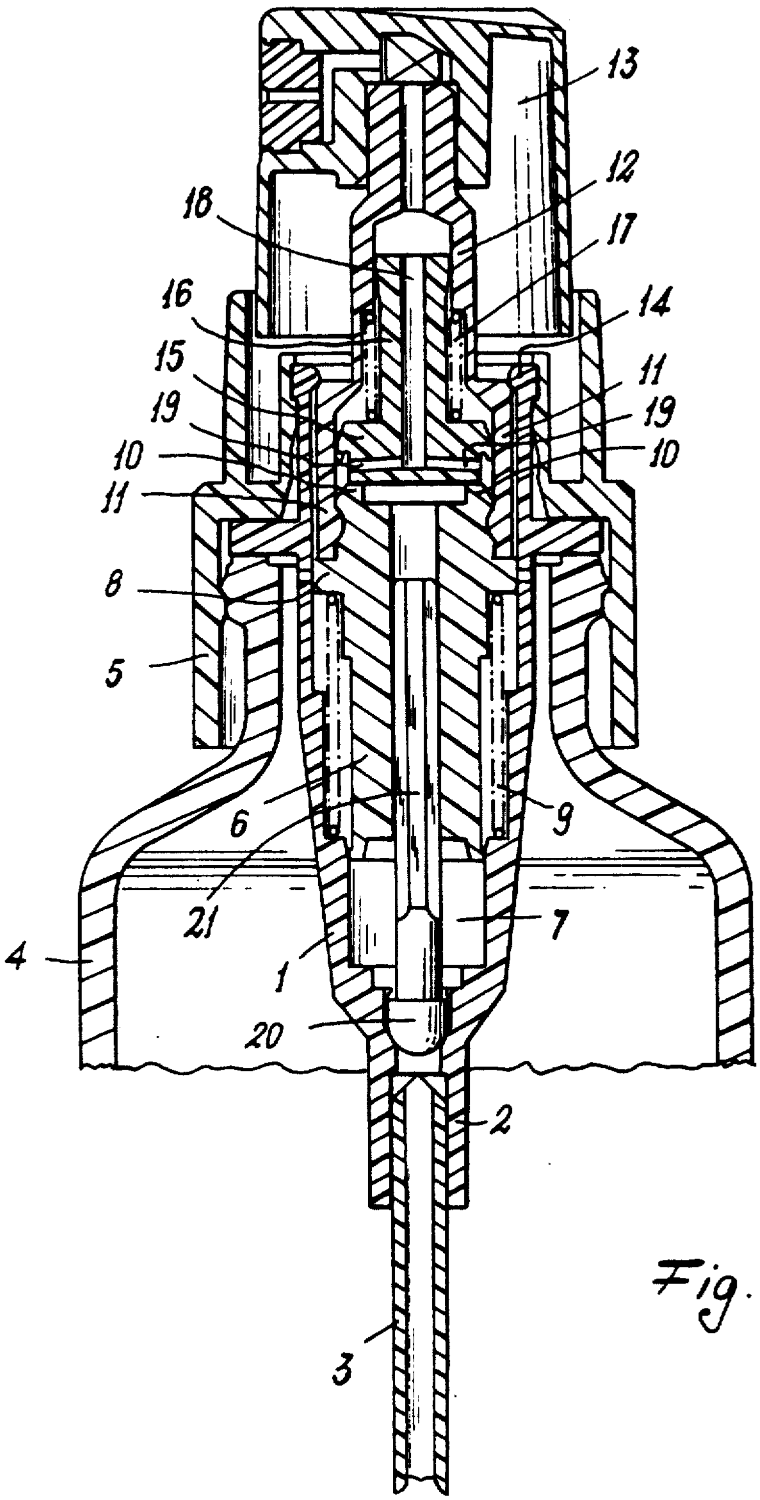
FIG. 1 is an axial section through the pump in its rest state, mounted on a container.

The pump shown in the figures comprises an elongate hollow body 1 open at its upper end an closed at its lower end by an end wall provided with a hole at which there outwardly projects a hollow appendix 2 into which one end of a dip tube 3 is inserted, its other end being immersed in a fluid creamy or liquid substance contained in a container 4, on the mouth of which the pump body 1 is mounted by a socket ring 5 (around a rim, or by other means).

A piston 6 is housed in and is mobile within the cavity of the body 1 and has its lower end in contact with and sealedly slidable against a cylindrical surface of the body 1 defining a pressure chamber 7.

In proximity to the upper end of the piston 6 there projects an annular collar 8 which is in contact with and sealedly slides against a corresponding cylindrical portion of the body cavity having a larger cross-section than that of the chamber 7, as can be clearly seen from the drawings. Around the outside of the piston 6 there is mounted a precompressed spring 9 which acts on the collar 8 and on a shoulder provided within the body 1. It can be seen that the spring 9 is external to the chamber 7 and can therefore not come into contact with the substance contained in the container 4.

The piston 6 is traversed by an axial longitudinal duct the upper end of which opens into a widened recess delimited by an endless annular ridge 10 which projects from the upper end of the piston.

On the upper part of the piston 6 there is sealedly mounted the lower widened portion 11 of a hollow stem which has an elongate portion 12 of smaller cross-section projecting outwards from the body 1 to form a hollow appendix on which a dispensing cap 13 of any known type can be mounted. The upper edge of the widened portion 11 of the stem 11, 12 is urged by the spring 9 (when the pump is in its rest state, shown in FIG. 1) against an annular retention edge 14 projecting inwards from the free upper edge of the body 1.

A valving member housed in and movable within the cavity in the stem 11, 12 has a widened base 15 from which there extends an elongate cylindrical appendix 16 of cross-section less than that of the base 15. The peripheral edge of the valving member base 15 slides sealedly against the adjacent cylindrical surface defining the stem cavity at its widened portion 11. The valving member appendix 16 slides sealedly within a cylindrical seat provided in the cavity of the stem appendix 12.

Against the base 15 of the valving member there acts a precompressed spring 17, its other end acting against a shoulder provided within the appendix 12, the spring being unable to come into contact with the substance dispensed by the pump as the spring lies between two sealed contact regions between the stem and valving member.

When the pump is in its rest state shown in FIG. 1, the spring 17 maintains the base 15 of the valving member pressing against the upper edge of the annular piston ridge 10, against which it seals.

The appendix 16 of the valving member comprises a longitudinal duct 18 which is open only at the free end of the appendix. In the base 15 of the valving member, below that edge which seals against the surface of the stem portion 11, there are provided radial holes 19 one end of which opens into the duct 18 and the other end of which opens into a surface of the base 15 which is not in contact either with the opposing surface of the stem or with the ridge 10, as can be clearly seen in FIG. 1. This means that when the pump is in the rest state shown in FIG. 1, the duct 18 of the valving member is not in communication with the duct through the piston 6.

Finally, it can be seen that the pump comprises a unidirectional valve consisting of a widened profiled body 20 rigid with a longitudinally grooved rod 21 housed in and mobile within the duct of the piston 6. The body 20 (when in the rest state) is contained in and seals against a profiled seat provided in the body 1 at the hole which communicates with the appendix 2.

To understand the operation and basic characteristics of the pump according to the present invention it will be assumed that it is initially in the rest state shown in FIG. 1.

On pressing the cap 13 downwards, the stem 11, 12 lowers to push the piston 6 downwards. As only air (compressible fluid) is present in the pressure chamber 7 during the initial stage of operation of the pump, the pressure attained in the chamber 7 and hence in the chamber between the valving member and piston is insufficient to overcome the preload of the spring 17 and raise the valving member 15, 16; with the continuation of the downward travel of the stem 11, 12 the top of the rod 21 of the unidirectional valve intercepts the lower surface of the base 15 of the valving member 15, 16 causing the base 15 to rise from the ridge 10 of the piston 6. Under these conditions the chamber 7 becomes connected to the duct 18 via the duct provided through the piston 6 and the radial holes 19, the air (precompressed) hence escaping easily through said duct 18.

Starting from this point, if the stem 11, 12 is left free to rise under the action of the spring 9 the passage between the chamber 7 and duct 18 is again completely closed as the mechanical action of the top of the rod 21 of the unidirectional valve 20, 21 against the valving member 15 ceases; as the upward travel of the stem and the piston connected to it continues, a vacuum is generated in the chamber 7 to draw the fluid or liquid into the chamber 7 via the dip tube 3 and the head 20 of the unidirectional valve.

In this manner, when the pump returns to its rest state it is already primed, i.e. full of fluid or liquid, which has been prevented from returning to the container by the head 20 of the valve 20, 21.

On again pressing to produce the downward travel of the stem 11, 12 and piston 6 with the pump now primed, whereas the stem and piston travel downwards the valving member 15, 16 is compelled to move upwards relative to the piston as the fluid or liquid lying below it is incompressible. At this point the connection between the chamber 7, the radial holes 19 and the duct 18 is immediately opened while the valving member is urged further upwards because of the increase in force due to the instantaneous change in the surface area of the valving member against which the compressed fluid can exert an upward thrust.

Figure 2:
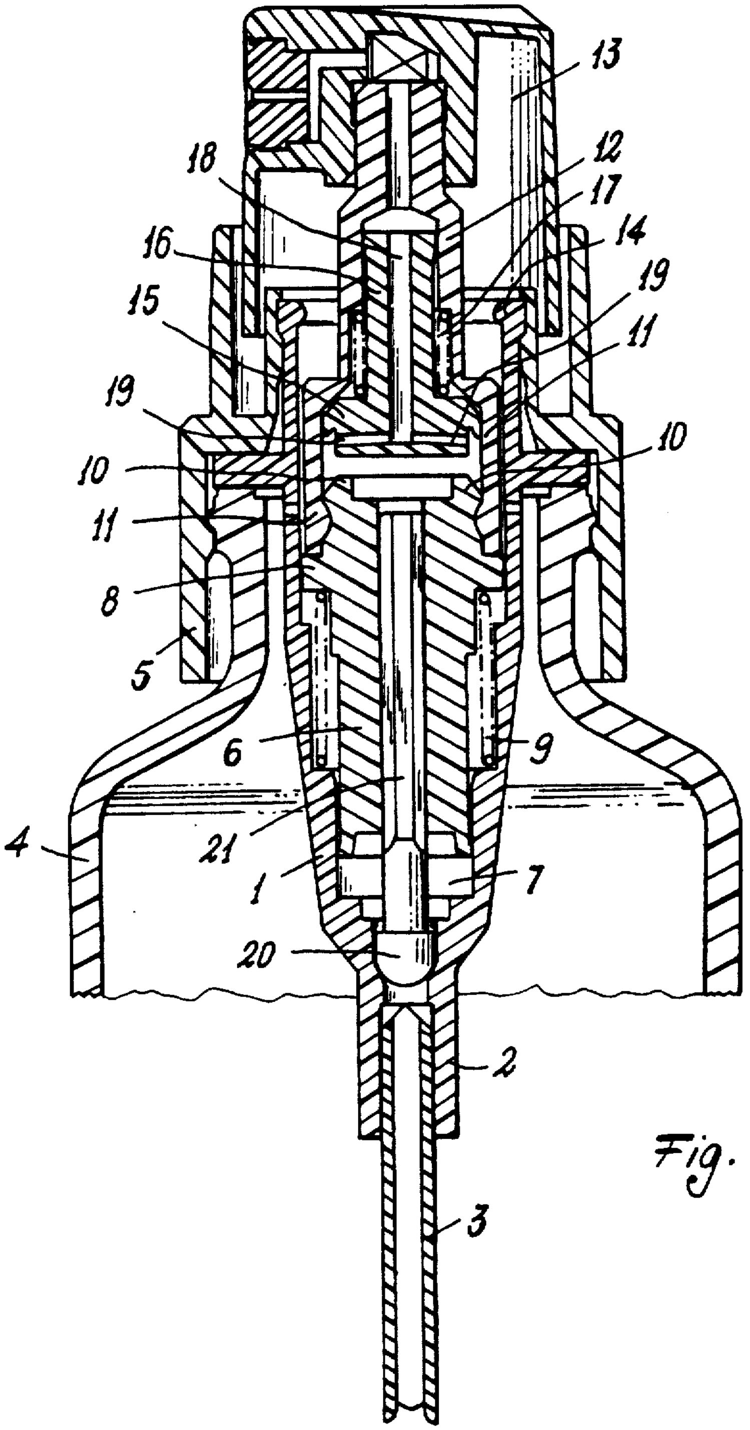
FIG. 2 is an axial section through the pump in its dispensing state.

In this manner a passage of relatively large cross-section suddenly opens (FIG. 2) to allow easy outflow of the fluid or liquid from the chamber 7 to the holes 19 and hence to the channel 18 of the stem, to allow a perfectly atomized delivery at a predetermined constant pressure (predetermined by the preload and pressure of the spring 17).

At this point, analogously to manually operated pumps of known type, even if the downward travel of the stem 11, 12 and piston 6 is interrupted but the piston 6 is kept pressed downwards, the delivery continues at constant pressure until the valving member 15, 16 has been lowered to a point at which it makes contact with the annular ridge 10 of the piston 6.

The fundamental characteristics of the pump of the invention which account for its high and satisfactory performance are:

a structure designed to prevent the fluid or liquid making contact with metal parts;

the particular shape of the top end part of the piston 6, which defines below the base 15 of the valving member and within the annular ridge 10 a chamber having a surface area substantially less than the free surface area below said base 15 when the valving member is raised away from the ridge 10; this characteristic means that the valving member is raised quickly (practically instantaneously) with a force which is much greater than the initial preload of the spring 17, to uncover a large cavity for the outflow of the fluid or liquid and hence allow this outflow with minimum pressure drop during the passage of the fluid or liquid from the chamber 7 to the duct 18. In this respect, if the precise moment at which the valving member is raised by the pressure generated in the chamber 7 and hence in the chamber below the base 15 within the ridge 10 during the delivery and dispensing of the fluid or liquid is considered, it is apparent that the thrust deriving from the pressure within said chamber suddenly increases considerably because the fluid pressure suddenly acts on a surface area larger than the base 15, it also including the area external to the ridge 10. This determines instantaneous raising of the valving member 15, 16 and hence instantaneous connection of the chamber 7 to the duct 18.

The basic result of this characteristic is the instantaneous opening of the fluid or liquid dispensing ducts during the delivery stage at the moment in which the pressure determined by the preload of the spring 17 is reached, this resulting in delivery of the liquid or creamy substance at a predetermined constant pressure in finely atomized form without dripping.

I claim:

1. A manually operated pump for dispensing liquid or creamy substances at a predetermined constant pressure, said pump comprising:

an elongate hollow body open at one end and closed at the other end by an end wall having a hole, a hollow first appendix projecting from the other end of said body and one end of a dip tube being insertable into the hollow first appendix;

a piston housed in and movable within a cavity of said body, said piston having, at an end close to said end wall of the hollow body, a portion which slides in a sealed manner along a corresponding portion of the hollow body, said piston further having an annular collar which projects from the piston in proximity from the other end of said piston, the annular collar sliding along a corresponding cylindrical portion of said hollow body, said piston being traversed by a substantially axial first longitudinal duct having one end which opens into a widened recess defined by an endless annular ridge which projects from the other end of said piston, said endless annular ridge being sealedly connected to a widened portion of a hollow stem which is housed in the cavity of said body and retained therein by a retention element provided on the hollow body, an elongate cylindrical second appendix extending from said widened portion of the stem and outwardly from said hollow body, said elongate cylindrical second appendix being traversed by a fluid dispensing channel, a chamber being defined by a stem cavity at said widened portion of said hollow stem and the other end of said piston which is connected to the widened portion, the annular ridge on the piston being positioned at a center of said chamber;

a valving member housed and movable within said chamber and having a widened base and a cylindrical third appendix, the widened base of said valving member having a peripheral cylindrical edge which sealedly slides along an adjacent cylindrical surface of the stem cavity defined by the widened portion of said hollow stem;

a first precompressed spring provided between the valving member and the hollow stem, said precompressed spring maintaining the valving member pressed against said annular ridge to seal against it when the pump is at rest;

a second duct provided in the valving member, said second duct being opened only at a free end of the cylindrical third appendix;

at least one substantially radial hole provided in the widened base of the valving member, one end of said radial hole opening into said second duct of the valving member, the other end of said radial hole opening into said chamber in a region between said peripheral cylindrical edge of said valving member and the annular ridge beyond the periphery of the ridge;

a second precompressed spring for urging the piston together with said stem towards and against said retention element of the hollow body, said second precompressed spring acting between said hollow body and said piston; and a unidirectional valve provided within the hollow body for closing the hole provided in the end wall of the hollow body and allowing fluid to enter the pump.

2. A pump as claimed in claim 1, wherein said cylindrical third appendix projects from the base of the valving member and extends into and is sealedly movable within a cylindrical seat provided in said elongate second appendix of the stem, the first spring which acts between the valving member and the hollow stem being positioned between the widened base of the valving member and that portion of the cylindrical third appendix of the valving member which seals against a respective seat of the stem.

3. A pump as claimed in one of claims 1 or 2, wherein said unidirectional valve consists of a profiled body which can sealedly rest in a profiled seat provided in the end wall of the hollow body in correspondence with the hole provided within it, from said profiled body there projecting an elongate rod which extends into and is movable within the first duct traversing said piston.

* * * * *